(12) United States Patent
Koll

(10) Patent No.: US 7,933,777 B2
(45) Date of Patent: Apr. 26, 2011

(54) HYBRID SPEECH RECOGNITION

(75) Inventor: Detlef Koll, Pittsburgh, PA (US)

(73) Assignee: Multimodal Technologies, Inc., Pittsburgh, PA (US)

( * ) Notice: Subject to any disclaimer, the term of this patent is extended or adjusted under 35 U.S.C. 154(b) by 100 days.

(21) Appl. No.: 12/550,380

(22) Filed: Aug. 30, 2009

(65) Prior Publication Data

US 2010/0057450 A1 Mar. 4, 2010

Related U.S. Application Data

(60) Provisional application No. 61/093,220, filed on Aug. 29, 2008.

(51) Int. Cl.
*G10L 21/00* (2006.01)
(52) U.S. Cl. ............. 704/270.1; 704/231; 704/270; 704/251; 704/257; 704/244; 370/353; 370/448; 370/458; 379/88.01; 379/88.05
(58) Field of Classification Search ............ 704/270.1, 704/275, 270, 231, 251, 276, 257, 244, 9, 704/201; 370/353, 448, 458; 379/88.05, 379/88.01
See application file for complete search history.

(56) References Cited

U.S. PATENT DOCUMENTS

| | | | | |
|---|---|---|---|---|
| 5,101,375 A | * | 3/1992 | Goldhor | 715/234 |
| 5,365,574 A | * | 11/1994 | Hunt et al. | 379/88.02 |
| 5,956,683 A | * | 9/1999 | Jacobs et al. | 704/270.1 |
| 6,006,183 A | * | 12/1999 | Lai et al. | 704/235 |
| 6,101,473 A | * | 8/2000 | Scott et al. | 704/275 |
| 6,125,345 A | * | 9/2000 | Modi et al. | 704/240 |
| 6,292,781 B1 | * | 9/2001 | Urs et al. | 704/270.1 |
| 6,363,349 B1 | | 3/2002 | Urs et al. | |
| 6,366,578 B1 | * | 4/2002 | Johnson | 370/353 |
| 6,377,922 B2 | * | 4/2002 | Brown et al. | 704/251 |
| 6,487,534 B1 | | 11/2002 | Thelen et al. | |
| 6,633,848 B1 | * | 10/2003 | Johnson et al. | 704/277 |
| 6,785,654 B2 | | 8/2004 | Cyr et al. | |
| 6,898,567 B2 | * | 5/2005 | Balasuriya | 704/231 |
| 7,181,401 B2 | * | 2/2007 | Johnson et al. | 704/277 |
| 7,363,228 B2 | * | 4/2008 | Wyss et al. | 704/275 |
| 2001/0036255 A1 | * | 11/2001 | Reformato et al. | 379/88.01 |
| 2002/0091518 A1 | * | 7/2002 | Baruch et al. | 704/231 |
| 2004/0083098 A1 | * | 4/2004 | Mozer et al. | 704/231 |
| 2004/0083103 A1 | * | 4/2004 | Mozer et al. | 704/251 |
| 2004/0128144 A1 | * | 7/2004 | Johnson et al. | 704/278 |

(Continued)

FOREIGN PATENT DOCUMENTS

JP 2005-249829 A 9/2005

(Continued)

OTHER PUBLICATIONS

International Search Report and Written opinion for PCT Patent Application No. PCT/US2009/055479, mailed on Apr. 9, 2010, 12 pages.

*Primary Examiner* — Vijay B Chawan
(74) *Attorney, Agent, or Firm* — Robert Plotkin, P.C.

(57) ABSTRACT

A hybrid speech recognition system uses a client-side speech recognition engine and a server-side speech recognition engine to produce speech recognition results for the same speech. An arbitration engine produces speech recognition output based on one or both of the client-side and server-side speech recognition results.

3 Claims, 9 Drawing Sheets

U.S. PATENT DOCUMENTS

| | | |
|---|---|---|
| 2004/0210443 A1* | 10/2004 | Kuhn et al. .................. 704/276 |
| 2005/0065796 A1* | 3/2005 | Wyss et al. .................. 704/270 |
| 2005/0215260 A1 | 9/2005 | Ahya et al. |
| 2006/0111909 A1* | 5/2006 | Maes et al. .................. 704/270 |
| 2006/0167696 A1* | 7/2006 | Chaar et al. .................. 704/270 |
| 2008/0162136 A1* | 7/2008 | Agapi et al. .................. 704/251 |
| 2010/0057450 A1* | 3/2010 | Koll .............................. 704/231 |
| 2010/0057451 A1* | 3/2010 | Carraux et al. ............... 704/231 |
| 2010/0145683 A1* | 6/2010 | Schroeter ..................... 704/201 |

FOREIGN PATENT DOCUMENTS

| | | |
|---|---|---|
| JP | 2007-033901 A | 2/2007 |
| KR | 10-2006-0089288 A | 8/2006 |

* cited by examiner

HYBRID SPEECH RECOGNITION

CROSS-REFERENCE TO RELATED APPLICATIONS

This application claims the benefit of and commonly-owned U.S. Prov. Pat. App. Ser. No. 61/093,220, filed on Aug. 29, 2008, entitled, "Hybrid Speech Recognition," which is hereby incorporated by reference herein.

BACKGROUND

A variety of automatic speech recognizers (ASRs) exist for performing functions such as converting speech into text and controlling the operations of a computer in response to speech. Some applications of automatic speech recognizers require shorter turnaround times (the amount of time between when the speech is spoken and when the speech recognizer produces output) than others in order to appear responsive to the end user. For example, a speech recognizer that is used for a "live" speech recognition application, such as controlling the movement of an on-screen cursor, may require a shorter turnaround time (also referred to as a "response time") than a speech recognizer that is used to produce a transcript of a medical report.

The desired turnaround time may depend, for example, on the content of the speech utterance that is processed by the speech recognizer. For example, for a short command-and-control utterance, such as "close window," a turnaround time above 500 ms may appear sluggish to the end user. In contrast, for a long dictated sentence which the user desires to transcribe into text, response times of 1000 ms may be acceptable to the end user. In fact, in the latter case users may prefer longer response times because they may otherwise feel that their speech is being interrupted by the immediate display of text in response to their speech. For longer dictated passages, such as entire paragraphs, even longer response times of multiple seconds may be acceptable to the end user.

In typical prior art speech recognition systems, improving response time while maintaining recognition accuracy requires increasing the computing resources (processing cycles and/or memory) that are dedicated to performing speech recognition. Similarly, in typical prior art speech recognition systems, recognition accuracy may typically be increased without sacrificing response time only by increasing the computing resources that are dedicated to performing speech recognition. One example of a consequence of these tradeoffs is that when porting a given speech recognizer from a desktop computer platform to an embedded system, such as a cellular telephone, with fewer computing resources, recognition accuracy must typically be sacrificed if the same response time is to be maintained.

One known technique for overcoming these resource constraints in the context of embedded devices is to delegate some or all of the speech recognition processing responsibility to a speech recognition server that is located remotely from the embedded device and which has significantly greater computing resources than the embedded device. When a user speaks into the embedded device in this situation, the embedded device does not attempt to recognize the speech using its own computing resources. Instead, the embedded device transmits the speech (or a processed form of it) over a network connection to the speech recognition server, which recognizes the speech using its greater computing resources and therefore produces recognition results more quickly than the embedded device could have produced with the same accuracy. The speech recognition server then transmits the results back over the network connection to the embedded device. Ideally this technique produces highly-accurate speech recognition results more quickly than would otherwise be possible using the embedded device alone.

In practice, however, this use of server-side speech recognition technique has a variety of shortcomings. In particular, because server-side speech recognition relies on the availability of high-speed and reliable network connections, the technique breaks down if such connections are not available when needed. For example, the potential increases in speed made possible by server-side speech recognition may be negated by use of a network connection without sufficiently high bandwidth. As one example, the typical network latency of an HTTP call to a remote server can range from 100 ms to 500 ms. If spoken data arrives at a speech recognition server 500 ms after it is spoken, it will be impossible for that server to produce results quickly enough to satisfy the minimum turnaround time (500 ms) required by command-and-control applications. As a result, even the fastest speech recognition server will produce results that appear sluggish if used in combination with a slow network connection.

What is needed, therefore, are improved techniques for producing high-quality speech recognition results for embedded devices within the turnaround times required by those devices, but without requiring low-latency high-availability network connections.

SUMMARY

A hybrid speech recognition system uses a client-side speech recognition engine and a server-side speech recognition engine to produce speech recognition results for the same speech. An arbitration engine produces speech recognition output based on one or both of the client-side and server-side speech recognition results.

Other features and advantages of various aspects and embodiments of the present invention will become apparent from the following description and from the claims.

DETAILED DESCRIPTION

Figure 1:
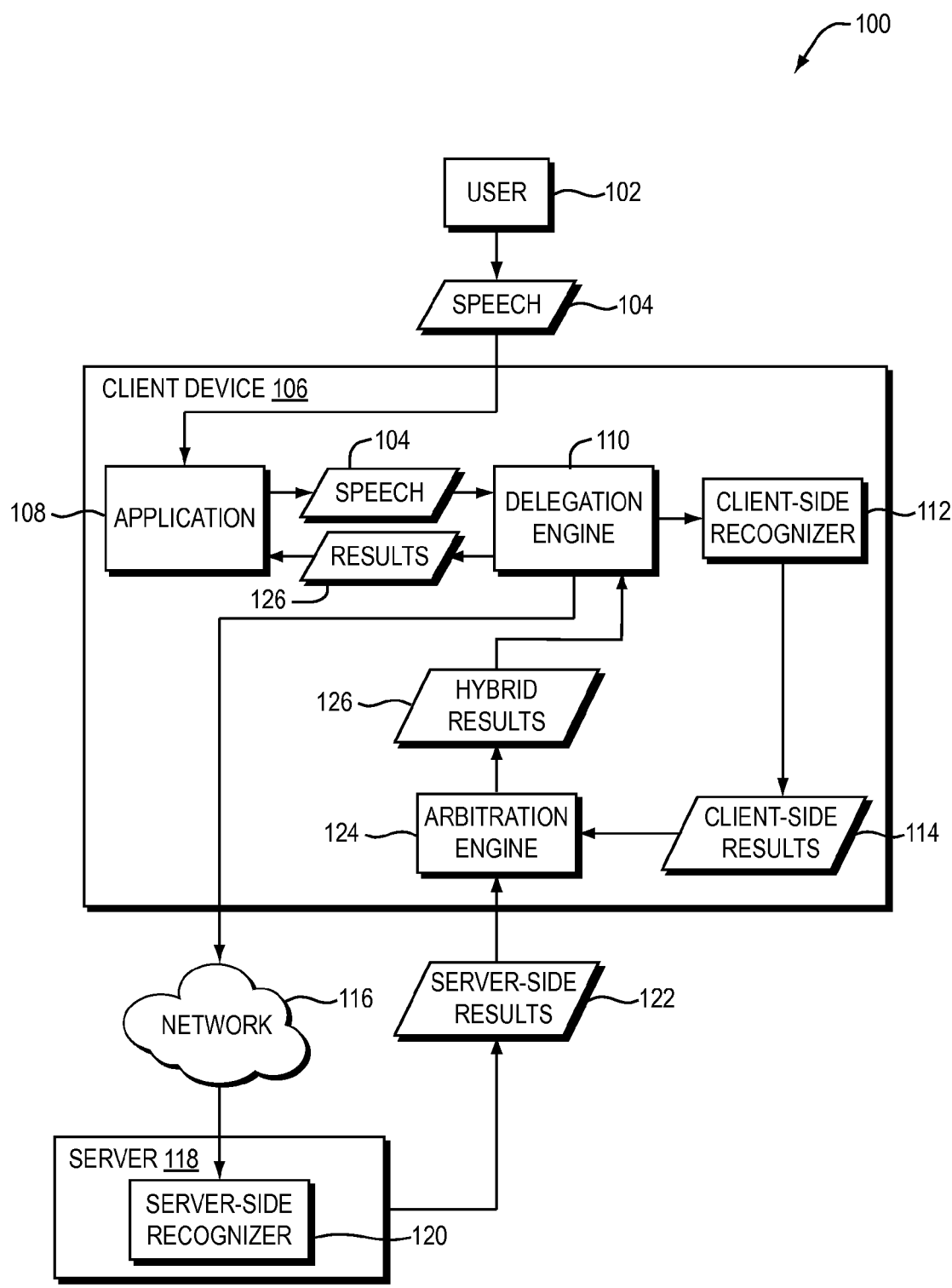
FIG. 1 is a dataflow diagram of a speech recognition system according to one embodiment of the present invention.
Figure 2:
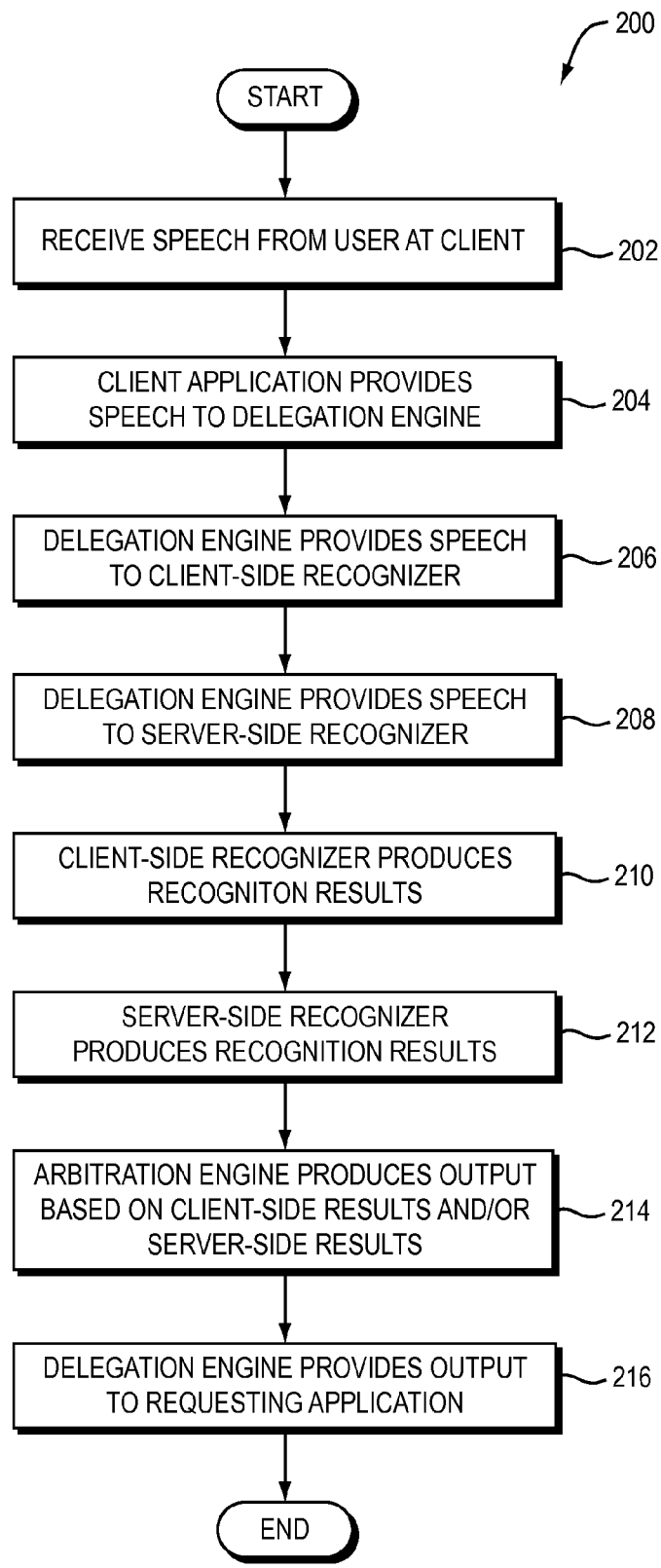
FIG. 2 is a flowchart of a method performed by the system of FIG. 1 according to one embodiment of the present invention.

Referring to FIG. 1, a dataflow diagram is shown of a speech recognition system 100 according to one embodiment of the present invention. Referring to FIG. 2, a flowchart is shown of a method 200 performed by the system 100 of FIG. 1 according to one embodiment of the present invention.

A user 102 of a client device 106 speaks and thereby provides speech 104 to the client device (step 202). The client device 106 may be any device, such as a desktop or laptop computer, cellular telephone, personal digital assistant (PDA), or telephone. Embodiments of the present invention, however, are particularly useful in conjunction with resource-constrained clients, such as computers or mobile computing devices with slow processors or small amounts of memory, or computers running resource-intensive software. The device 106 may receive the speech 104 from the user 102 in any way, such as through a microphone connected to a sound card. The speech 104 may be embodied in an audio signal which is tangibly stored in a computer-readable medium and/or transmitted over a network connection or other channel.

The client device 106 includes an application 108, such as a transcription application or other application which needs to recognize the speech 104. The application 108 transmits the speech 104 to a delegation engine 110 (step 204). Alternatively, the application 108 may process the speech 104 in some way and provide the processed version of the speech 104, or other data derived from the speech 104, to the delegation engine 110. The delegation engine 110 itself may process the speech 104 (in addition to or instead of any processing performed on the speech by the application) in preparation for transmitting the speech for recognition.

The delegation engine 110 may present the same interface to the application 108 as that presented by a conventional automatic speech recognition engine. As a result, the application 108 may provide the speech 104 to the delegation engine 110 in the same way that it would provide the speech 104 directly to a conventional speech recognition engine. The creator of the application 108, therefore, need not know that the delegation engine 110 is not itself a conventional speech recognition engine. As will be described in more detail below, the delegation engine 110 also provides speech recognition results back to the application 108 in the same manner as a conventional speech recognition engine. Therefore, the delegation engine 110 appears to perform the same function as a conventional speech recognition engine from the perspective of the application 108.

The delegation engine 110 provides the speech 104 (or a processed form of the speech 104 or other data derived from the speech 104) to both a client-side automatic speech recognition engine 112 in the client device 106 (step 206) and to a server-side automatic speech recognition engine 120 in a server 118 located remotely over a network 116 (step 208). The server 118 may be a computing device which has significantly greater computing resources than the client device.

The client-side speech recognizer 112 and server-side speech recognizer 120 may be conventional speech recognizers. The client-side speech recognizer 112 and server-side speech recognizer 120 may, however, differ from each other. For example, the server-side speech recognizer 120 may use more complex speech recognition models which require more computing resources than those used by the client-side speech recognizer 112. As another example, one of the speech recognizers 112 and 120 may be speaker-independent, while the other may be adapted to the voice of the user 102. The client-side recognizer 112 and server-side recognizer 120 may have different response times due to a combination of differences in the computing resources of the client 106 and server 118, differences in the speech recognizers themselves 112 and 120, and the fact that the results from the server-side recognizer 120 must be provided back to the client device 106 over the network 116, thereby introducing latency not incurred by the client-side recognizer 112.

Responsibilities may be divided between the client-side speech recognizer 112 and server-side speech recognizer 120 in various ways, whether or not such recognizers 112 and 120 differ from each other. For example, the client-side speech recognizer 112 may be used solely for command-and-control speech recognition, while the server-side speech recognizer 112 may be used for both command-and-control and dictation recognition. As another example, the client-side recognizer 112 may only be permitted to utilize up to a predetermined maximum percentage of processor time on the client device 106. The delegation engine 110 may be configured to transmit appropriate speech to the client-side recognizer 112 and server-side recognizer 120 in accordance with the responsibilities of each.

The client-side recognizer 112 produces speech recognition results 114, such as text based on the speech 104 (step 210). Similarly, the server-side recognizer 120 produces speech recognition results 122, such as text based on the speech 104 (step 212). The results 114 may include other information, such as the set of best candidate words, confidence measurements associated with those words, and other output typically provided by speech recognition engines.

The client-side results 114 and server-side results 122 may differ from each other. The client-side recognizer 112 and server-side recognizer 120 both provide their results 114 and 112, respectively, to an arbitration engine 124 in the client device 106. The arbitration engine 124 analyzes one or both of the results 114 and 122 to decide which of the two results 114 and 122 to provide (as results 126) to the delegation engine 110 (step 214). As will be described in more detail below, the arbitration engine 124 may perform step 214 either after receiving both of the results 114 and 122, or after receiving one of the results 114 and 122 but not the other. Therefore, in general the arbitration engine 124 produces the output 126 based on the client-side results 114 and/or the server-side results 122.

The delegation engine 110 provides the selected results 126 back to the requesting application 108 (step 216). As a result, the requesting application 108 receives speech recognition results 126 back from the delegation engine 110 as if the delegation engine 110 were a single, integrated speech recognition engine 110. In other words, the details of the operations performed by the delegation engine 110 and arbitration engine 124 are hidden from the requesting application 108.

Figure 3A:
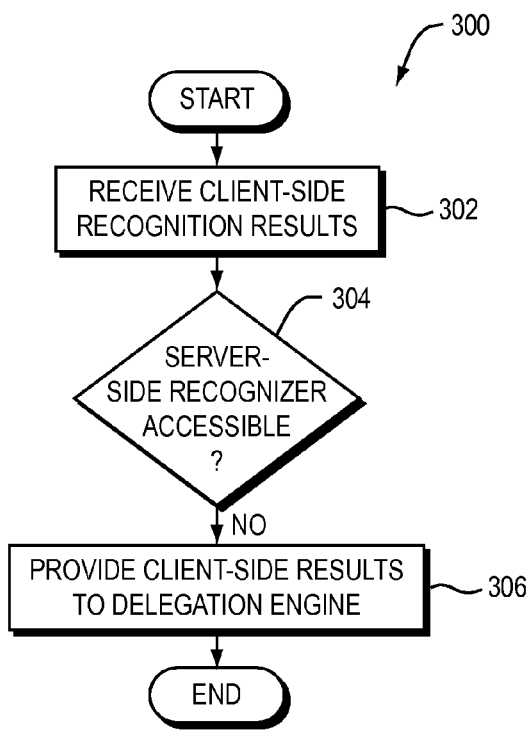
FIGS. 3A-3E are flowcharts of methods performed by an arbitration engine to produce hybrid speech recognition output according to various embodiments of the present invention.

The arbitration engine 124 may use any of a variety techniques to select which of the client-side results 114 and server-side results 122 to provide to the delegation engine 110. For example, as illustrated by the method 300 of FIG. 3A, the arbitration engine 124 may select the client-side results 114 as soon as those results 114 become available (step 302), if the server-side recognizer 120 is not accessible over the network (e.g., if the connection between the client 106 and the network 116 is down) (steps 304-306).

Figure 3B:
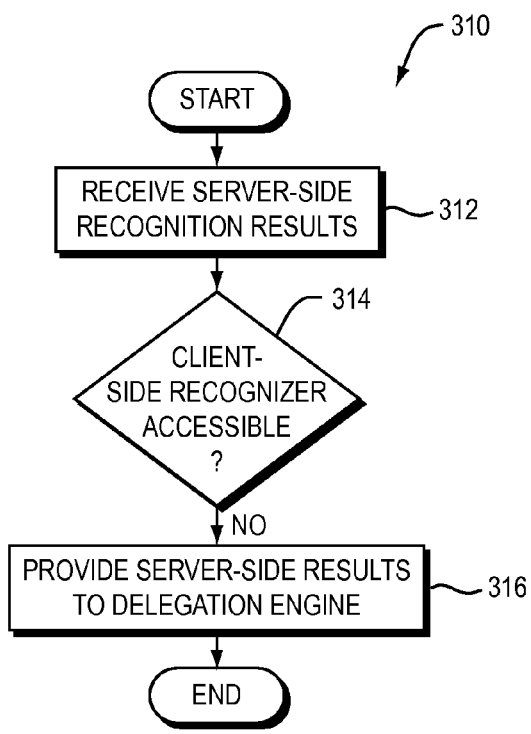

Conversely, as illustrated by the method 310 of FIG. 3B, the arbitration engine 124 may select the server-side results 122 as soon as those results 122 become available (step 312), if the client-side recognizer 112 is not accessible (steps 314-316). This may occur, for example, if the client-side recognizer 112 has been disabled as a result of a high-priority CPU task being executed on the client device 106.

Figure 3C:
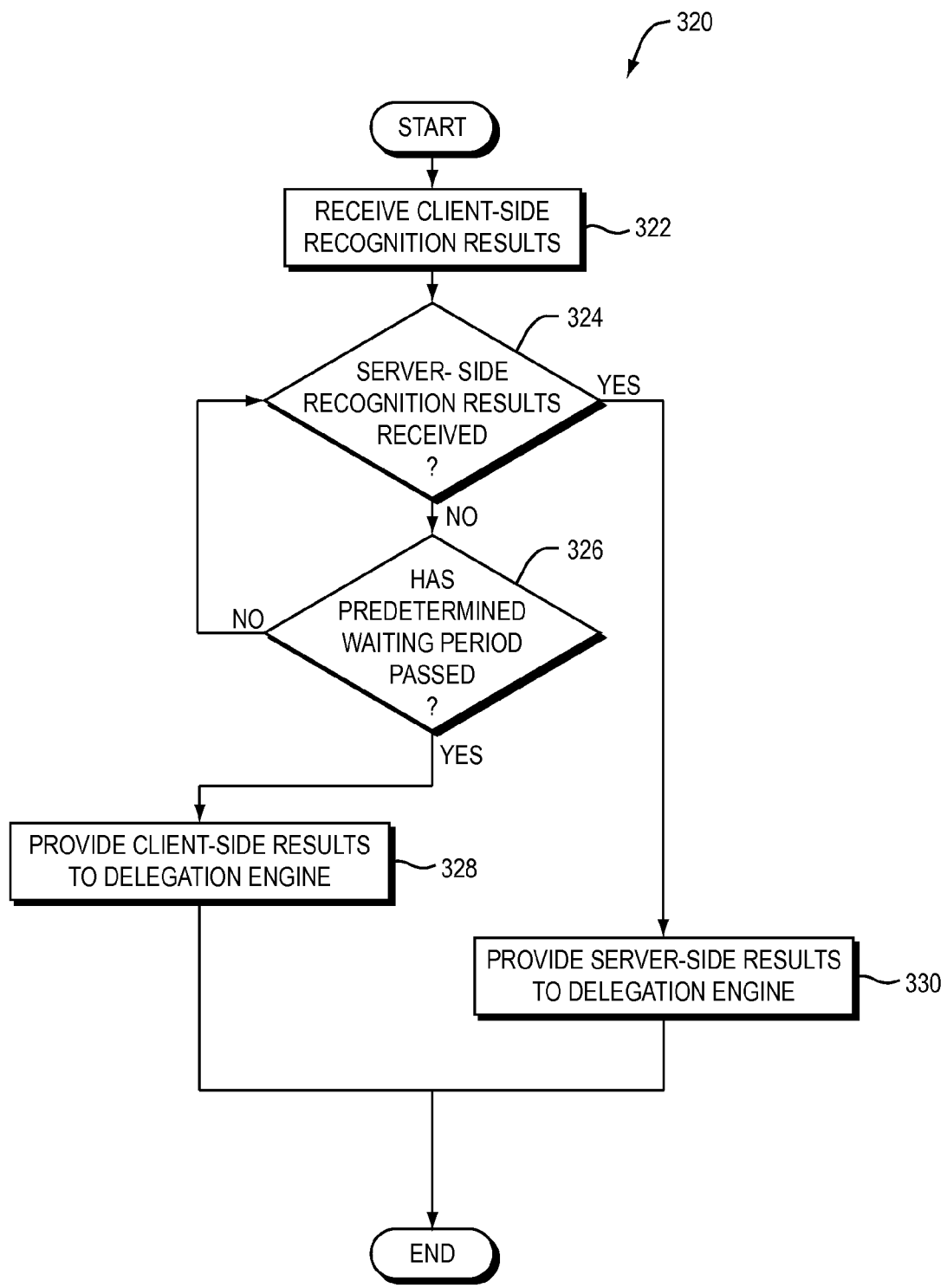

As another example, and assuming that the server-side recognizer 120 provides, on average, higher-quality recognition results than the client-side recognizer 112, the arbitration engine 124 may select the server-side recognizer's results 122 if those results 122 become available no later than a predetermined waiting time after the client-side recognizer's results 114 became available. In other words, as illustrated by the method 320 of FIG. 3C, once the client-side recognizer's results 114 become available (step 322), the arbitration engine 124 may return the server-side results 122 (step 330) only if they are received (step 324) before the predetermined waiting time has passed (step 326). If the server-side results 122 are not available by that time, then the arbitration engine 124 may return the client-side results 114 (step 328).

The predetermined waiting time may be selected in any way. For example, the predetermined waiting time may depend on the type of recognition result. For example, the predetermined waiting time applied by the method 320 to command-and-control grammars may be selected to be shorter than the predetermined waiting time applied to dictation grammars. As just one example, a predetermined waiting time of 500 ms may be applied to command-and-control grammars, while a predetermined waiting time of 1000 ms may be applied to dictation grammars.

Figure 3D:
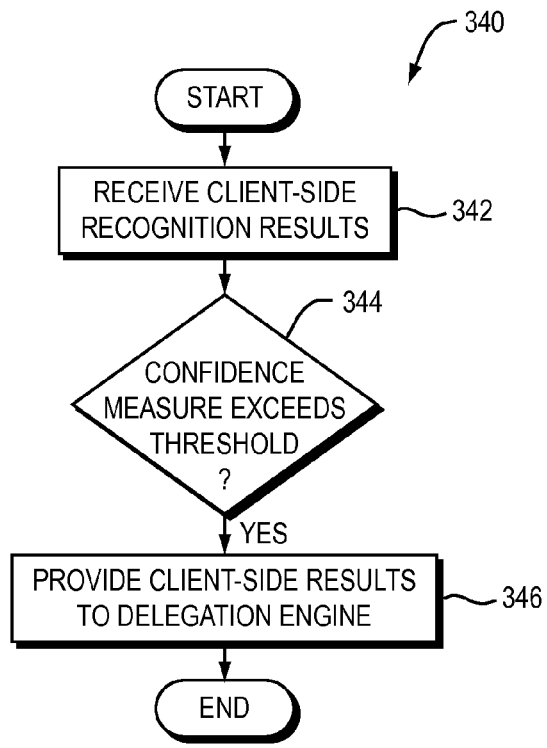

As yet another example, and as illustrated by the method 340 of FIG. 3D, even assuming that the server-side recognizer 120 provides, on average, higher-quality recognition results than the client-side recognizer 112, the arbitration engine 124 may select the client-side recognizer's results 114 (step 346) as soon as those results 114 become available (step 342), if the confidence measure associated with those results 114 exceeds some predetermined threshold value (step 344).

Figure 3E:
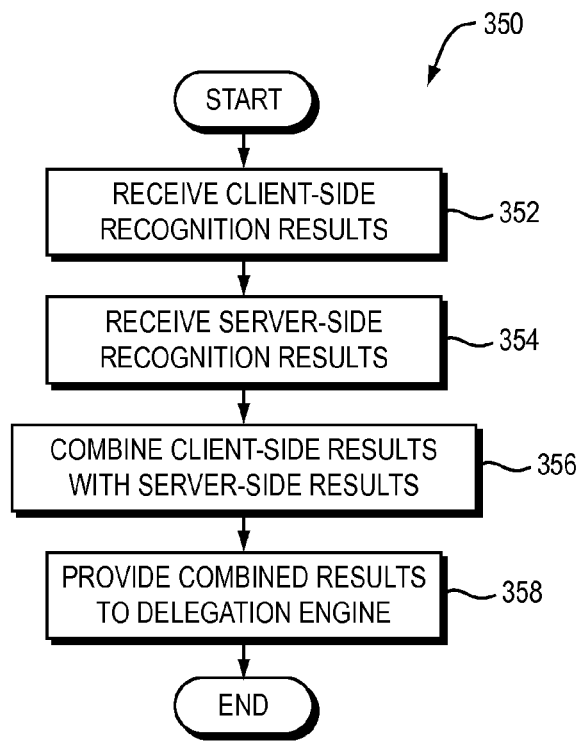

The arbitration engine 124 is not limited to "selecting" one or the other of the results 114 and 122 produced by the client-side recognizer 112 and server-side recognizer 120, respectively. Rather, for example, as illustrated by the method 350 of FIG. 3E, the arbitration engine 124 may receive the results 114 and 122 (steps 352 and 354), and combine or otherwise process those results 114 and 122 in various ways (step 356) to produce the output 126 provided back to the requesting application 108 (step 358). For example, the arbitration engine 124 may combine the results 114 and 122 using a well-known technology named ROVER (Recognizer Output Voting Error Reduction), or using other techniques, to produce the output 126.

The arbitration engine 124 may combine the techniques disclosed above with respect to FIGS. 3A-3E, and with other techniques, in any combination. For example, the method 340 of FIG. 3D may be combined with the method 320 of FIG. 3C by performing steps 344 and 346 of method 340 after step 322 in FIG. 3C, and proceeding to step 324 of FIG. 3C if the confidence measure in step 344 does not exceed the threshold.

Figure 4A:
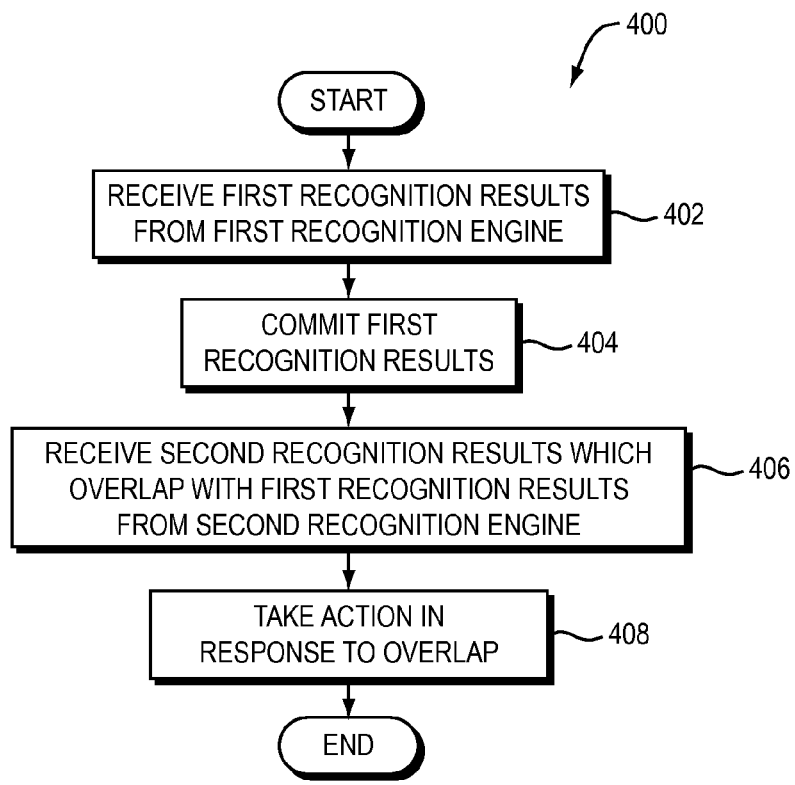
FIGS. 4A-4F are flowcharts of methods performed by a speech recognition system to process overlapping recognition results from multiple speech recognition engines according to various embodiments of the present invention.

It is possible for results from one of the recognizers 112 and 120 to overlap in time with the results from the other recognizer, as illustrated by the method 400 of FIG. 4A. For example, assume that the speech 104 is five seconds in duration, and that the client-side recognizer 112 produces high-confidence results 114 for the first two seconds of the speech 104 (step 402). As a result of the high confidence measure of the results 114, the arbitration engine 124 may submit those results 114 to the delegation engine 110, which commits those results 114 (i.e., includes the results 114 in the results 126 that are passed back to the application 108) before the server-side results 122 become available (step 404). Then, when the server-side results 122 for some or all of the same five seconds of speech 104 become available, some or all of those results 122 may conflict (overlap in time) with some or all the client-side results 114 (step 406). The arbitration engine 124 may take action in response to such overlap (step 408).

Figure 4B:
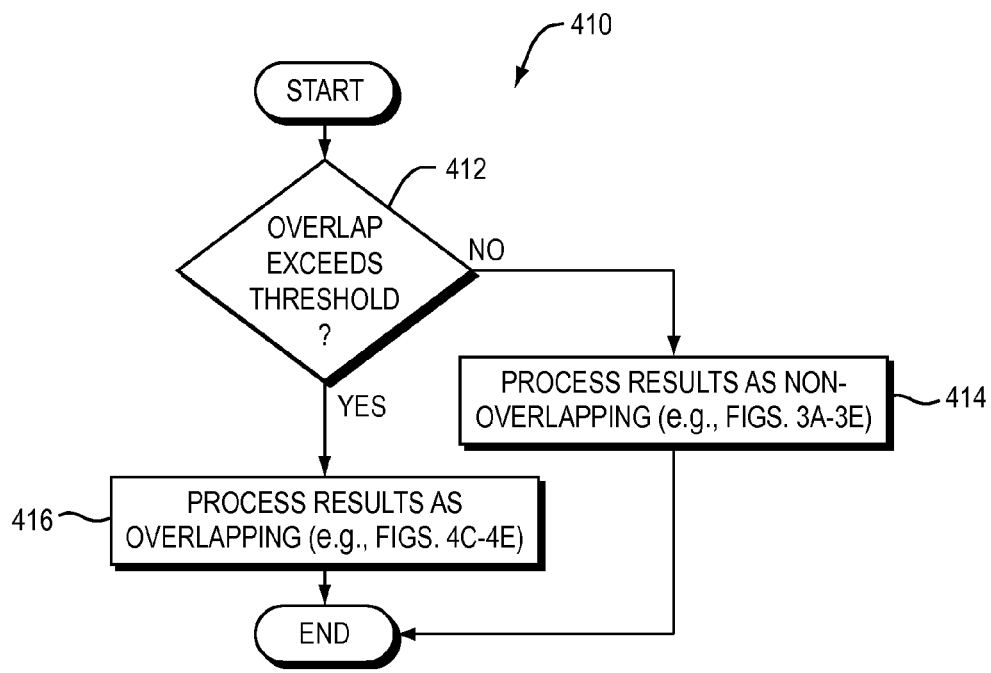
Figure 4C:
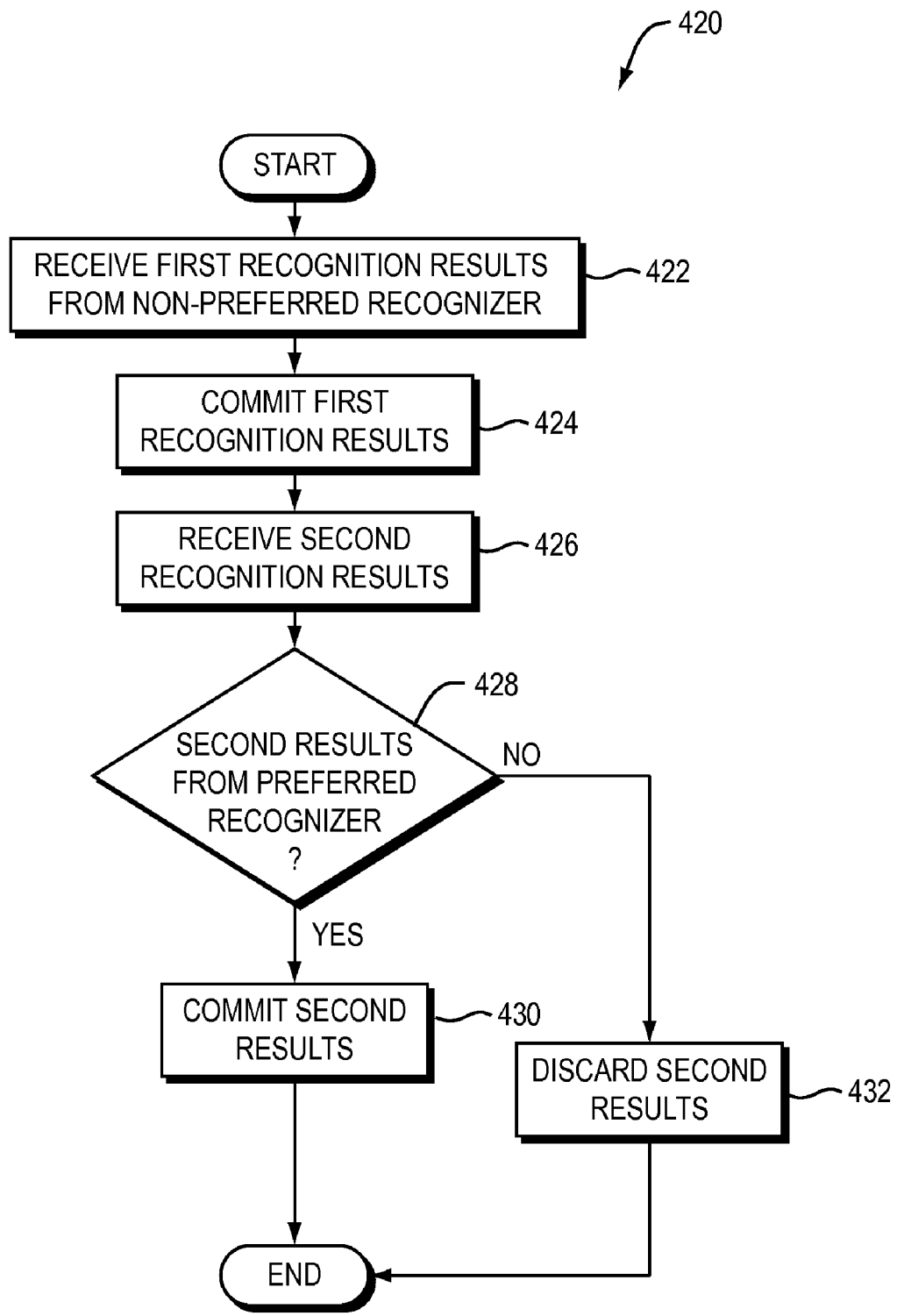

For example, as shown by the method 410 of FIG. 4B, if the client-side results 114 and the server-side results 122 overlap by less than some predetermined threshold time period (e.g., 100 ms) (step 412), then the arbitration engine 124 may consider results 114 and 122 to be non-overlapping and process them in any of the ways described above with respect to FIGS. 3A-3E (step 414). Otherwise, the arbitration engine 124 may consider the results 114 and 122 to be overlapping and process them accordingly, such as in the ways described in the following examples (step 416).

For example, as illustrated by the method 420 of FIG. 4B, the arbitration engine 124 may consider one of the recognizers (e.g., the server-side recognizer 120) to be preferred over the other recognizer. In this case, if results (e.g., client-side results 114) from the non-preferred recognizer arrive first (step 422) and are committed first (step 424), and then results (e.g., server-side results 122) from the preferred recognizer arrive (step 428) which overlap with the previously-committed non-preferred results, the arbitration engine 124 may commit (i.e., include in the hybrid results 126) the preferred results (e.g., server-side results 122) as well (step 430). Although this results in certain portions of the speech 104 being committed twice, this may produce more desirable results than discarding the results of a preferred recognizer. If the later-received results are not from the preferred recognizer, those results may be discarded rather than committed (step 432).

Figure 4D:
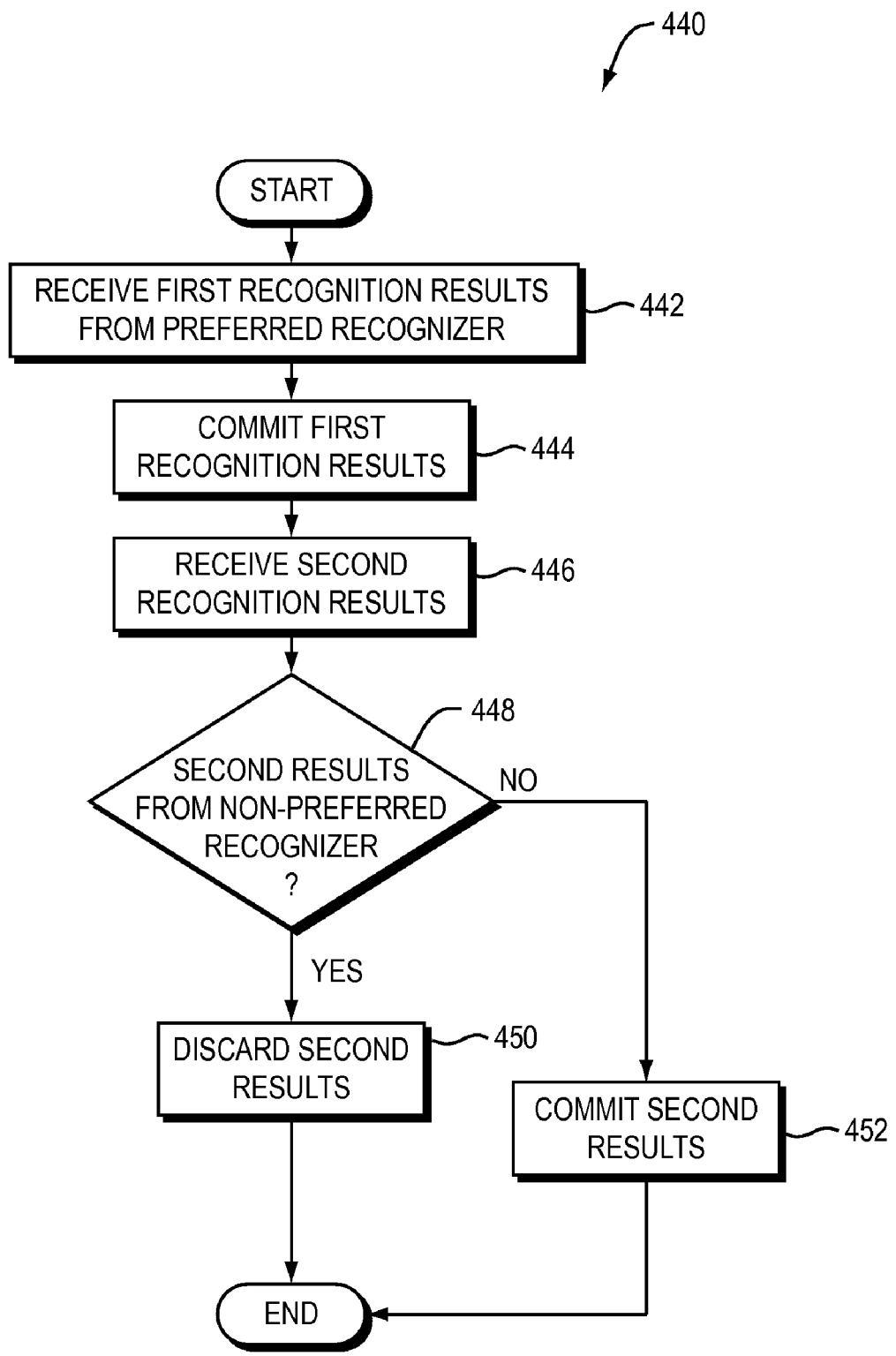

As yet another example, as illustrated by the method 440 of FIG. 4D, if results (e.g., server-side results 122) from the preferred recognizer arrive first (step 442) and are committed first (step 444), and then results (e.g., client-side results 114) from the non-preferred recognizer arrive which overlap with the previously-committed preferred results (steps 446 and 448), then the arbitration engine 124 may discard the non-preferred results (step 450). Otherwise, the arbitration engine 124 may commit the later-received results or process them in another manner (step 452).

Figure 4E:
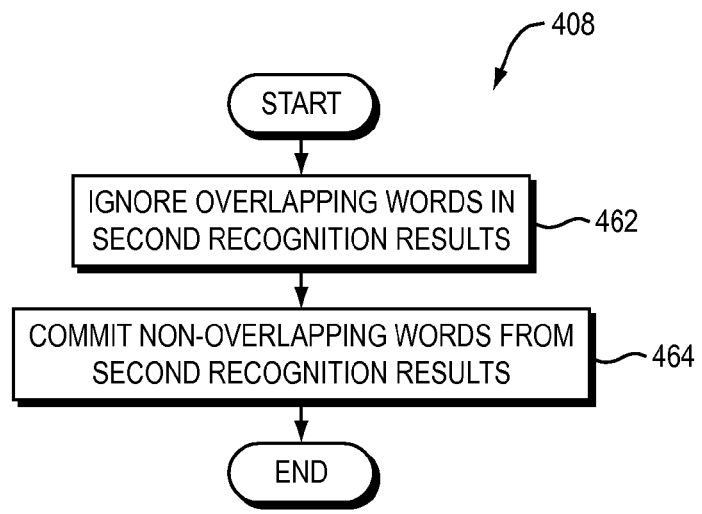

More generally, as illustrated by FIG. 4E (which represents one embodiment of step 408 of FIG. 4A), if the arbitration engine 124 receives recognition results which overlap with any previously-committed result received from (the same or different) speech recognizer, then the arbitration engine 124 may ignore the words from the new recognition results that overlap in time with the words from the old recognition results (using timestamps associated with each word in both recognition results) (step 462), and then commit the remaining (non-overlapping) words from the new recognition results (step 464).

Figure 4F:
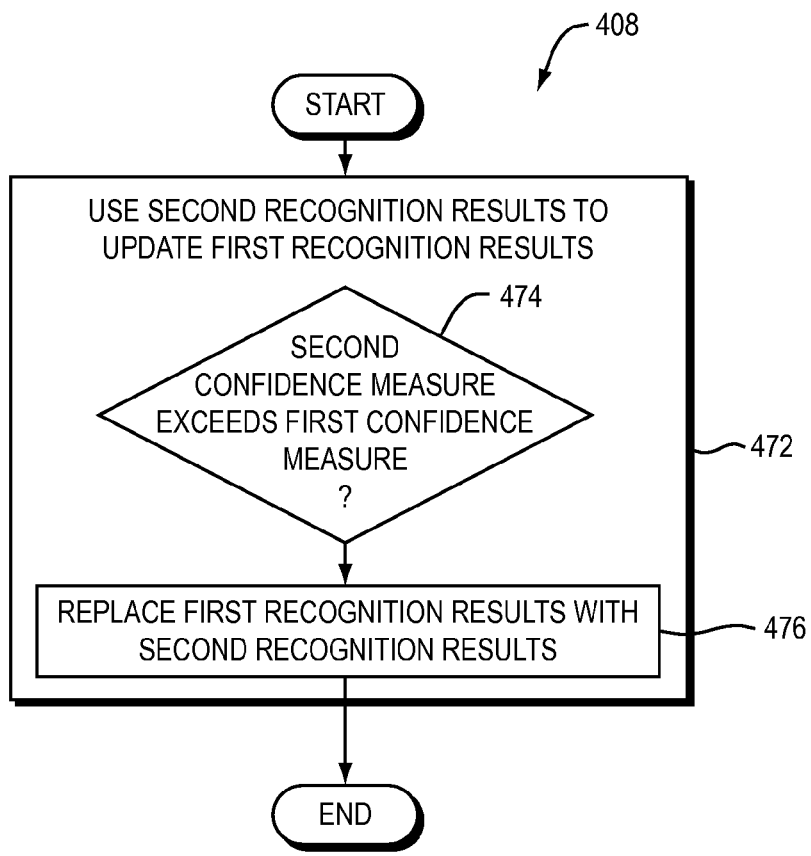
Figure 2:
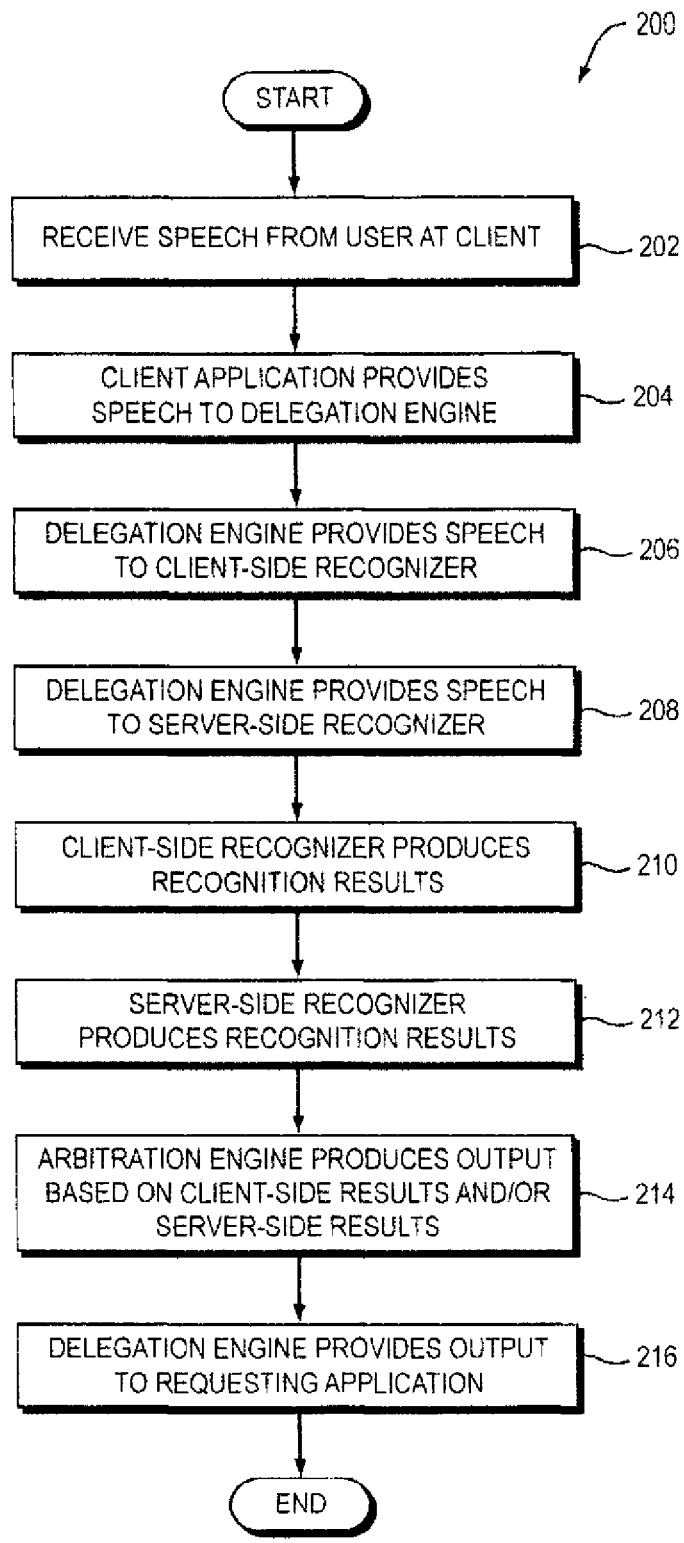

As yet another example, as illustrated by FIG. 4F (which represents one embodiment of step 408 of FIG. 4A), if the arbitration engine 124 receives recognition results which overlap with any previously-committed result received from (the same or different) speech recognizer, then the arbitration engine 124 may use the newly-received results to update the previously-committed results (step 472). For example, the arbitration engine 124 may determine whether the confidence measure associated with the newly-received results exceeds the confidence measure associated with the previously-committed results (step 474) and, if so, replace the previously-committed results with the newly-received results (step 476).

Embodiments of the present invention have a variety of advantages. In general, embodiments of the invention enable a client-side device, such as a cellular telephone, having limited resources to obtain high-quality speech recognition results within predetermined turnaround time requirements without requiring a high-availability, high-bandwidth network connection. The techniques disclosed herein effectively produce a hybrid speech recognition engine which uses both the client-side recognizer 112 and server-side recognizer 118 to produce better results than either of those recognizers could have produced individually. More specifically, the resulting hybrid result can have better operating characteristics with respect to system availability, recognition quality, and response time than could be obtained from either of the component recognizers 112 and 120 individually.

For example, the techniques disclosed herein may be used to satisfy the user's turnaround time requirements even as the availability of the network 116 fluctuates over time, and even as the processing load on the CPU of the client device 106 fluctuates over time. Such flexibility results from the ability of the arbitration engine 124 to respond to changes in the turnaround times of the client-side recognizer 112 and server-side recognizer 120, and in response to other time-varying factors. Embodiments of the present invention thereby provide a distinct benefit over conventional server-side speech recognition techniques, which break down if the network slows down or becomes unavailable.

Hybrid speech recognition systems implemented in accordance with embodiments of the present invention may provide higher speech recognition accuracy than is provided by the faster of the two component recognizers (e.g., the server-side recognizer 120 in FIG. 1). This is a distinct advantage over conventional server-side speech recognition techniques, which only provide results having the accuracy of the server-side recognizer, since that is the only recognizer used by the system.

Similarly, hybrid speech recognition systems implemented in accordance with embodiments of the present invention may provide a faster average response time than is provided by the slower of the two component recognizers (e.g., the client-side recognizer 112 in FIG. 1). This is a distinct advantage over conventional server-side speech recognition techniques, which only provide results having the response time of the server-side recognizer, since that is the only recognizer used by the system.

Furthermore, embodiments of the present invention impose no constraints on the type or combinations of recognizers that may be used to form the hybrid system. Each of the client-side recognizer 112 and server-side recognizer 120 may be any kind of recognizer. Each of them may be chosen without knowledge of the characteristics of the other. Multiple client-side recognizers, possibly of different types, may be used in conjunction with a single server-side recognizer to effectively form multiple hybrid recognition systems. Either of the client-side recognizer 112 or server-side recognizer 120 may be modified or replaced without causing the hybrid system to break down. As a result, the techniques disclosed herein provide a wide degree of flexibility that makes them suitable for use in conjunction with a wide variety of client-side and server-side recognizers.

Moreover, the techniques disclosed herein may be implemented without requiring any modification to existing applications which rely on speech recognition engines. As described above, for example, the delegation engine 110 may provide the same interface to the application 108 as a conventional speech recognition engine. As a result, the application 108 may provide input to and receive output from the delegation engine 110 as if the delegation engine 110 were a conventional speech recognition engine. The delegation engine 110, therefore, may be inserted into the client device 106 in place of a conventional speech recognition engine without requiring any modifications to the application 108.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

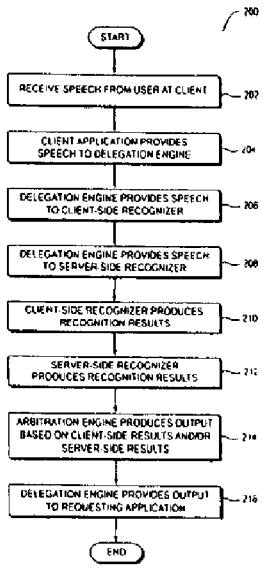

What is claimed is:

1. A computer-implemented method performed by a client device, the method comprising:
 (A) receiving a request from a requester to apply automatic speech recognition to an audio signal;
 (B) providing the audio signal to a first automatic speech recognition engine in the client device;
 (C) receiving first speech recognition results from the first automatic speech recognition engine at a first time;
 (D) providing the audio signal to a second automatic speech recognition engine in a server device;
 (E) determining whether second speech recognition results have been received by the client device from the second automatic speech recognition engine within a predetermined time period after the first time;
 (F) if the second speech recognition results have been received by the client device within the predetermined time period, then providing the second speech recognition results to the requester in response to the request; and (G) if the second speech recognition results have not been received by the client device within the predetermined time period, then providing the first speech recognition results to the requester in response to the request.

2. The method of claim 1, wherein (E) comprises selecting the predetermined time period based on a type of the second speech recognition results.

3. An apparatus comprising:
  means for receiving a request from a requester to apply automatic speech recognition to an audio signal;
  means for providing the audio signal to a first automatic speech recognition engine in the client device;
  means for receiving first speech recognition results from the first automatic speech recognition engine at a first time;
  means for providing the audio signal to a second automatic speech recognition engine in a server device;
  means for determining whether second speech recognition results have been received by the client device from the second automatic speech recognition engine within a predetermined time period after the first time;
  means for providing the second speech recognition results to the requester in response to the request if the second speech recognition results have been received by the client device within the predetermined time period; and
  means for providing the first speech recognition results to the requester in response to the request if the second speech recognition results have not been received by the client device within the predetermined time period.

* * * * *

UNITED STATES PATENT AND TRADEMARK OFFICE
CERTIFICATE OF CORRECTION

| | |
|---|---|
| PATENT NO. | : 7,933,777 B2 |
| APPLICATION NO. | : 12/550380 |
| DATED | : April 26, 2011 |
| INVENTOR(S) | : Detlef Koll |

It is certified that error appears in the above-identified patent and that said Letters Patent is hereby corrected as shown below:

The title page showing the illustrative figure should be deleted to be replaced with the attached title page.

On the title page, item (56), under (Other Publications), in column 2, line 1, delete "for" and insert -- received for --, therefor.

In the drawing sheet, consisting of Fig. 2, should be deleted to be replaced with the drawing sheet, consisting of Fig. 2, as shown on the attached page.

Signed and Sealed this
Thirteenth Day of September, 2011

David J. Kappos
*Director of the United States Patent and Trademark Office*

(12) United States Patent
Koll

(10) Patent No.: US 7,933,777 B2
(45) Date of Patent: Apr. 26, 2011

(54) HYBRID SPEECH RECOGNITION

(75) Inventor: Detlef Koll, Pittsburgh, PA (US)

(73) Assignee: Multimodal Technologies, Inc., Pittsburgh, PA (US)

(*) Notice: Subject to any disclaimer, the term of this patent is extended or adjusted under 35 U.S.C. 154(b) by 100 days.

(21) Appl. No.: 12/550,380

(22) Filed: Aug. 30, 2009

(65) Prior Publication Data
US 2010/0057450 A1 Mar. 4, 2010

Related U.S. Application Data

(60) Provisional application No. 61/093,220, filed on Aug. 29, 2008.

(51) Int. Cl.
*G10L 21/00* (2006.01)
(52) U.S. Cl. .......... 704/270.1; 704/231; 704/270; 704/251; 704/257; 704/244; 370/353; 370/448; 370/458; 379/88.01; 379/88.05
(58) Field of Classification Search .......... 704/270.1, 704/275, 270, 231, 251, 276, 257, 244, 9, 704/201; 370/353, 448, 458; 379/88.05, 379/88.01
See application file for complete search history.

(56) References Cited

U.S. PATENT DOCUMENTS

| | | | | |
|---|---|---|---|---|
| 5,101,375 A * | 3/1992 | Goldhor | | 715/234 |
| 5,365,574 A * | 11/1994 | Hunt et al. | | 379/88.02 |
| 5,956,683 A * | 9/1999 | Jacobs et al. | | 704/270.1 |
| 6,006,183 A * | 12/1999 | Lai et al. | | 704/235 |
| 6,101,473 A * | 8/2000 | Scott et al. | | 704/275 |
| 6,125,345 A * | 9/2000 | Modi et al. | | 704/240 |
| 6,292,781 B1 * | 9/2001 | Urs et al. | | 704/270.1 |
| 6,363,349 B1 | 3/2002 | Urs et al. | | |
| 6,366,578 B1 * | 4/2002 | Johnson | | 370/353 |
| 6,377,922 B2 * | 4/2002 | Brown et al. | | 704/251 |
| 6,487,534 B1 | 11/2002 | Thelen et al. | | |
| 6,633,848 B1 * | 10/2003 | Johnson et al. | | 704/277 |
| 6,785,654 B2 | 8/2004 | Cyr et al. | | |
| 6,898,567 B2 * | 5/2005 | Balasuriya | | 704/231 |
| 7,181,401 B2 * | 2/2007 | Johnson et al. | | 704/277 |
| 7,363,228 B2 * | 4/2008 | Wyss et al. | | 704/275 |
| 2001/0036255 A1 * | 11/2001 | Reformato et al. | | 379/88.01 |
| 2002/0091518 A1 * | 7/2002 | Baruch et al. | | 704/231 |
| 2004/0083098 A1 * | 4/2004 | Mozer et al. | | 704/231 |
| 2004/0083103 A1 * | 4/2004 | Mozer et al. | | 704/251 |
| 2004/0128144 A1 * | 7/2004 | Johnson et al. | | 704/278 |

(Continued)

FOREIGN PATENT DOCUMENTS

JP 2005-249829 A 9/2005

(Continued)

OTHER PUBLICATIONS

International Search Report and Written opinion for PCT Patent Application No. PCT/US2009/055479, mailed on Apr. 9, 2010, 12 pages.

*Primary Examiner* — Vijay B Chawan
(74) *Attorney, Agent, or Firm* — Robert Plotkin, P.C.

(57) ABSTRACT

A hybrid speech recognition system uses a client-side speech recognition engine and a server-side speech recognition engine to produce speech recognition results for the same speech. An arbitration engine produces speech recognition output based on one or both of the client-side and server-side speech recognition results.

3 Claims, 9 Drawing Sheets